(12) United States Patent
Maltsev et al.

(10) Patent No.: US 7,570,696 B2
(45) Date of Patent: Aug. 4, 2009

(54) MULTIPLE INPUT MULTIPLE OUTPUT MULTICARRIER COMMUNICATION SYSTEM AND METHODS WITH QUANTIZED BEAMFORMING FEEDBACK

(75) Inventors: Alexander A. Maltsev, Nizhny Novgorod (RU); Ali S Sadri, San Diego, CA (US); Sergey A. Tiraspolsky, Nizhny Novgorod (RU); Alexander Flaksman, Nizhny Novgorod (RU); Alexei V Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1240 days.

(21) Appl. No.: 10/877,943

(22) Filed: Jun. 25, 2004

(65) Prior Publication Data
US 2005/0287978 A1 Dec. 29, 2005

(51) Int. Cl.
*H04L 27/28* (2006.01)
(52) U.S. Cl. ................................... 375/260
(58) Field of Classification Search ............ 375/260, 375/347, 267, 147, 150, 149; 455/403, 562.1, 455/101, 102, 103, 69, 73; 342/372, 368, 342/377, 383
See application file for complete search history.

(56) References Cited

U.S. PATENT DOCUMENTS

| | | | |
|---|---|---|---|
| 5,001,776 A | 3/1991 | Clark | |
| 5,417,665 A | 5/1995 | De La Mata et al. | |
| 5,471,665 A | 11/1995 | Pace et al. | |
| 5,898,912 A | 4/1999 | Heck et al. | |
| 6,052,085 A * | 4/2000 | Hanson et al. | 342/373 |
| 6,321,073 B1 | 11/2001 | Luz et al. | |
| 6,473,467 B1 | 10/2002 | Wallace et al. | |
| 6,498,929 B1 | 12/2002 | Tsurumi et al. | |
| 6,717,981 B1 | 4/2004 | Mohindra | |
| 6,876,859 B2 | 4/2005 | Anderson et al. | |
| 6,927,728 B2 * | 8/2005 | Vook et al. | 342/377 |
| 7,085,587 B2 | 8/2006 | Oono et al. | |
| 7,196,579 B2 | 3/2007 | Ozawa | |
| 7,409,189 B2 | 8/2008 | Song | |
| 2001/0033622 A1 | 10/2001 | Jongren et al. | |
| 2002/0094792 A1 | 7/2002 | Oono et al. | |
| 2003/0064696 A1 | 4/2003 | Akamine et al. | |
| 2003/0181170 A1 | 9/2003 | Sim | |

(Continued)

FOREIGN PATENT DOCUMENTS

EP 1416688 A1 5/2004

(Continued)

OTHER PUBLICATIONS

Stephens, A. P., "IEEE 802.11 TGn Comparison Criteria", *IEEE 802.11-02/814r2*, (IEEE P802.1—Wireless LANs),(Nov. 2003),5 pgs.

(Continued)

*Primary Examiner*—Khai Tran
(74) *Attorney, Agent, or Firm*—Schwegman, Lundberg & Woessner, P.A.; Gregory J. Gorrie

(57) ABSTRACT

A multicarrier receiver generates a quantized transmit beamformer matrix ($\tilde{V}$) for each subcarrier of a multicarrier communication channel for use by a multicarrier transmitting station. The multicarrier receiver applies a corrected receiver beamformer matrix ($\tilde{U}^H$) to received subcarriers signals generated by signals received from the transmitting station.

34 Claims, 11 Drawing Sheets

U.S. PATENT DOCUMENTS

| | | | |
|---|---|---|---|
| 2004/0087324 | A1 | 5/2004 | Ketchum et al. |
| 2004/0120411 | A1 | 6/2004 | Walton et al. |
| 2004/0157573 | A1 | 8/2004 | Lee et al. |
| 2005/0181754 | A1 | 8/2005 | Wu et al. |
| 2005/0208919 | A1 | 9/2005 | Walker et al. |
| 2005/0221763 | A1 | 10/2005 | Song |
| 2006/0114816 | A1 | 6/2006 | Maltsev et al. |
| 2006/0120469 | A1 | 6/2006 | Maltsev et al. |
| 2007/0047634 | A1 | 3/2007 | Kang et al. |
| 2007/0230595 | A1* | 10/2007 | Waxman ............ 375/260 |

FOREIGN PATENT DOCUMENTS

| | | |
|---|---|---|
| WO | WO-2005/029804 A2 | 3/2005 |
| WO | WO-2006/007299 A1 | 1/2006 |
| WO | WO-2006/060241 A1 | 6/2006 |

OTHER PUBLICATIONS

"International Search Report for corresponding PCT Application No. PCT/US2005/019884", (Sep. 23, 2005),4 pgs.

Bangerter, B., et al., "Wireless Technologies: High-Throughput Wireless LAN Air Interface", *Intel Technology Journal*, 7(3), (Aug. 19, 2003),47-57.

Jöngren, G., et al., "Utilizing Quantized Feedback Information In Orthogonal Space-Time Block Coding", *Proceedings of IEEE Global Telecommunication Conference, GLOBECOM '00*, 2(4), (Nov. 27, 2000),995-999.

Love, David J., et al., "Grassmannian Beamforming for Multiple-Input Multiple-Output Wireless Systems", *IEEE Transactions on Information Theory*, vol. 49, No. 10, (Oct. 2003), 2735-2747.

U.S. Appl. No. 10/812,834, Final Office Action Mailed Dec. 31, 2007, 17 pgs.

U.S. Appl. No. 10/812,834 Non-Final Office Action mailed Jul. 9, 2007, 13 pgs.

U.S. Appl. No. 10/812,834 Response filed Feb. 11, 2008 to Final Office Action mailed Dec. 31, 2007, 8 pgs.

U.S. Appl. No. 10/812,834 Response filed Oct. 9, 2007 to Non-Final Office Action mailed Jul. 9, 2007, 12 pgs.

Korean Office Action, Korean Application No. 2006-7027306, (Jan. 31, 2008), 4 pgs.

Bangerter, B., et al., "High-Throughput Wireless LAN Air Interface", *Intel Technology Journal*, 7(3), http://developer.intel.com/technology/itj/index.htm,(Aug. 9, 2003),47-57.

International Search Report, "Application No. PCT/US2005/019884, ", (Sep. 23, 2005),4 pgs.

"U.S. Appl. No. 10/812,834 Notice of Allowance mailed Mar. 25, 2008", 9 Pgs.

* cited by examiner

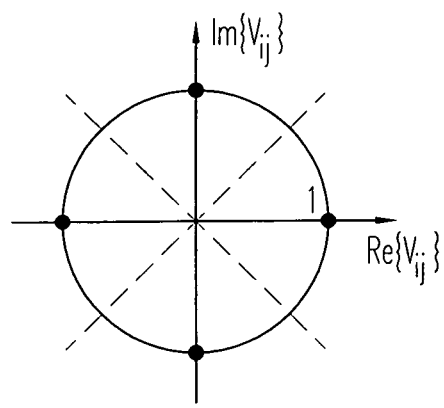
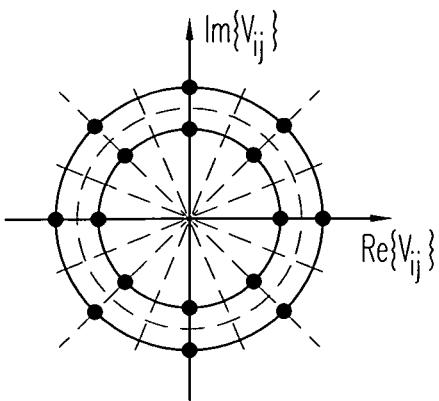
Fig. 3A　　　　　　　　Fig. 3B
AMPLITUDE SUBFIELD
| AMPLITUDE BITS | AMPLITUDE |
|---|---|
| 000 | $\sqrt{0.0625}$ |
| 001 | $\sqrt{0.1875}$ |
| 011 | $\sqrt{0.3125}$ |
| 010 | $\sqrt{0.4375}$ |
| 110 | $\sqrt{0.5625}$ |
| 111 | $\sqrt{0.6875}$ |
| 101 | $\sqrt{0.8125}$ |
| 100 | $\sqrt{0.9375}$ |
Fig. 4A

404

PHASE SUBFIELD

405

| PHASE BITS | PHASE |
|---|---|
| 0000 | $\pi$ |
| 0001 | $-7\pi/8$ |
| 0011 | $-3\pi/4$ |
| 0010 | $-5\pi/8$ |
| 0110 | $-\pi/2$ |
| 0111 | $-3\pi/8$ |
| 0101 | $-\pi/4$ |
| 0100 | $-\pi/8$ |
| 1100 | 0 |
| 1101 | $\pi/8$ |
| 1111 | $\pi/4$ |
| 1110 | $3\pi/8$ |
| 1010 | $\pi/2$ |
| 1011 | $5\pi/8$ |
| 1001 | $3\pi/4$ |
| 1000 | $7\pi/8$ |

Fig. 4B

| BITS PER TX WEIGHT COEFFICIENT | ACTION |
|---|---|
| 0000 | A=A+1, P=P+2 |
| 0001 | A=A+1, P=P+1 |
| 0011 | A=A+1, P – NO CHANGE |
| 0010 | A=A+1, P=P-1 |
| 0110 | A=A+1, P=P-2 |
| 0111 | A=A – NO CHANGE, P=P+2 |
| 0101 | A=A – NO CHANGE, P=P+1 |
| 0100 | A=A – NO CHANGE, P – NO CHANGE |
| 1100 | A=A – NO CHANGE, P=P-1 |
| 1101 | A=A – NO CHANGE, P=P-2 |
| 1111 | A=A-1, P=P+2 |
| 1110 | A=A-1, P=P+1 |
| 1010 | A=A-1, P – NO CHANGE |
| 1011 | A=A-1, P=P-1 |
| 1001 | A=A-1, P=P-2 |
| 1000 | AMPLITUDE AND PHASE ARE SET EQUAL TO ZERO (PUNCTURING A SUBCARRIER FOR THE GIVEN ANTENNA) |

*Fig. 6A*

MULTIPLE INPUT MULTIPLE OUTPUT MULTICARRIER COMMUNICATION SYSTEM AND METHODS WITH QUANTIZED BEAMFORMING FEEDBACK

TECHNICAL FIELD

Embodiments of the present invention pertain to wireless communications, and in some embodiments, to multicarrier communications.

BACKGROUND

Wireless communication systems conventionally use feedback to allow a transmitting station to adapt it's transmissions to changing channel conditions. One problem with multicarrier communication systems that use many subcarriers, such as systems employing orthogonal frequency division multiplexed (OFDM) signals, is that the channel conditions may be different for each of the subcarriers. The amount of feedback to adapt to changing channel conditions may be significant and consumes bandwidth as well as uses additional energy. This is especially a concern when multiple antennas are used to communication additional data streams over the same subcarriers, as in the case of multiple input multiple output (MIMO) systems. Thus, there are general needs for systems and methods that may adapt to changing channel conditions with less feedback.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIGS. 3A and 3B illustrate quantization schemes in accordance with some embodiments of the present invention;

FIGS. 4A and 4B illustrate amplitude and phase subfields of quantized beamforming coefficients in accordance with some embodiments of the present invention;

FIGS. 6A and 6B illustrate quantized transmit beamforming coefficients in accordance with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention may be referred to, individually or collectively, herein by the term "invention" merely for convenience and without intending to voluntarily limit the scope of this application to any single invention or inventive concept if more than one is in fact disclosed.

Figure 1:
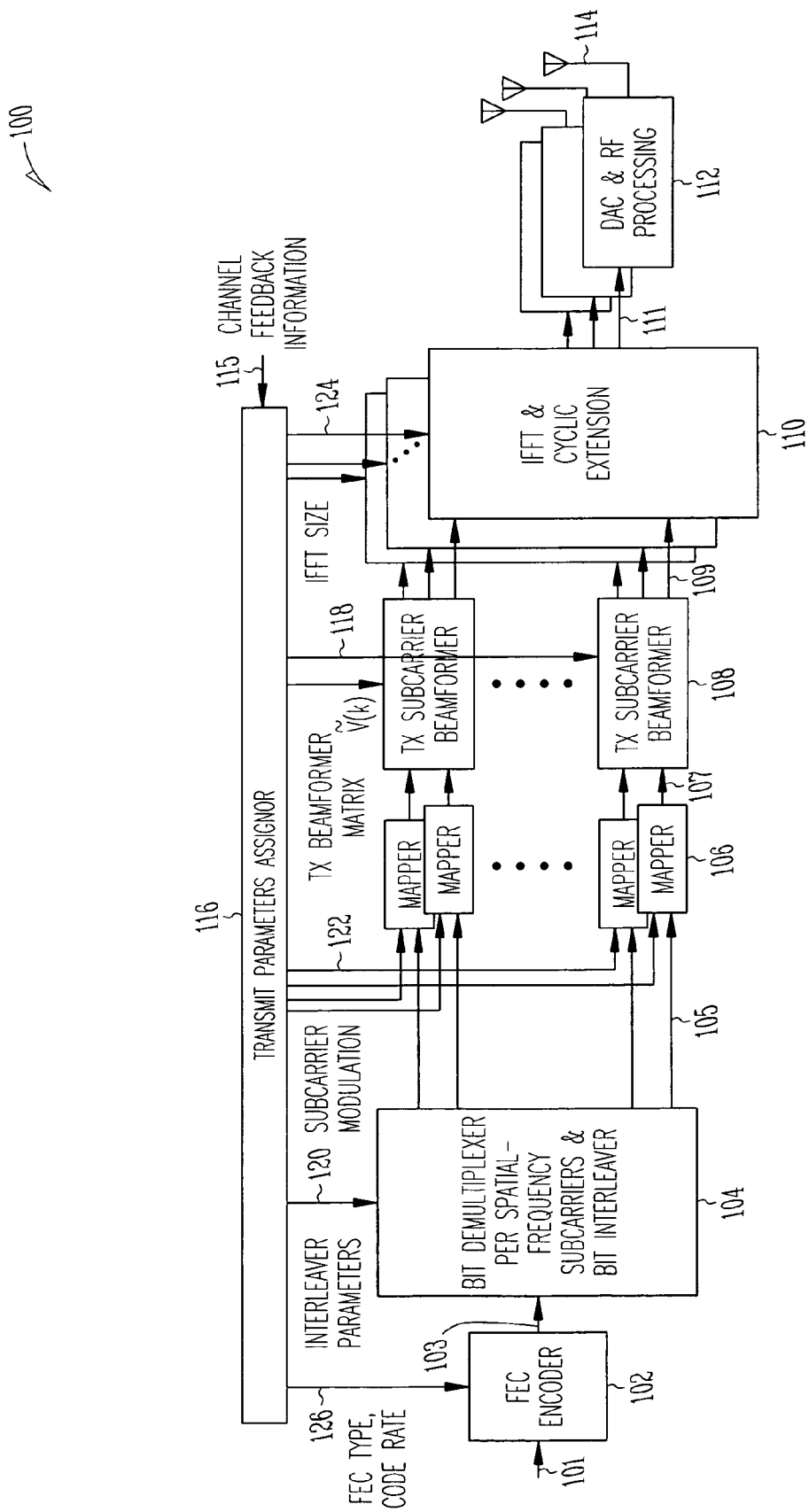
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 may be part of a wireless communication device and may transmit multicarrier communication signals comprising a plurality of subcarriers, such as orthogonal frequency division multiplexed (OFDM) communication signals, although the scope of the invention is not limited in this respect.

In accordance with some embodiments, multicarrier transmitter 100 may apply quantized transmit beamforming coefficients to symbol-modulated subcarriers of a multicarrier communication signal in a signal path before an inverse Fourier transform (IFFT) is performed on the subcarriers. The quantized transmit beamforming coefficients may comprise predetermined numbers of bits for each subcarrier indicating amounts to weight an amplitude and shift a phase of an associated symbol-modulated subcarrier. In some embodiments, multicarrier transmitter 100 may comprise a plurality of transmit subcarrier beamformers 108 to apply the quantized transmit beamforming coefficients to symbol-modulated subcarriers 107.

In some embodiments, the transmit subcarrier beamformers 108 may apply the quantized transmit beamforming coefficients in the frequency domain to frequency-domain symbol-modulated subcarriers 107 before an IFFT is performed on the symbol-modulated subcarriers. In some embodiments, a quantized transmit beamformer matrix ($\tilde{V}$) generated by a receiving station includes the transmit beamforming coefficients. In some embodiments, the transmit beamforming coefficients may be complex values.

The use of quantized transmit beamforming coefficients may significantly reduce the amount of feedback provided by a receiving station. In some embodiments, closed loop adaptive beamforming may performed by transmitter 100. The adaptive beamforming may generate signals for different spatial channels by taking into account multipath differences in the communication channel. Another purpose of the adaptive beamforming is to take into account the channel conditions (i.e., adapt to changing channel conditions of a fading channel) as well as take into account channel conditions between the transmitting and receiving stations.

In some embodiments, multicarrier transmitter 100 may be part of a closed loop multiple-input multiple-output (MIMO) system that performs adaptive beamforming based on singular value decomposition (SVD). In these embodiments, the MIMO system may be viewed as a plurality of decoupled (independent or orthogonal) single-input single-output (SISO) systems referred to as orthogonal spatial channels.

The number of orthogonal spatial channels is generally not greater than a minimum number of transmit and minimum number of receive antennas. In accordance with some embodiments of this invention, the spatial channels may be substantially orthogonal. The substantial orthogonality is achieved by applying appropriate transmit and receive beamforming coefficients.

In some embodiments, encoded bit stream 103 may be separated by bit demultiplexer of circuitry 104 into several flows (data streams) in accordance with the number of spatial channels. These flows may be referred to as spatial bit streams and may comprise the same number of bits when identical modulation and/or coding schemes are used for each of the spatial channels. The spatial bit streams may contain different numbers of bits when different modulation and/or coding schemes are used for each of the spatial channels, although the scope of the invention is not limited in this respect.

In some embodiments, each spatial channel may be used communicate separate and/or independent data streams on the same subcarriers as the other spatial channels allowing the transmission of additional data without an increase in frequency bandwidth. The use of spatial channels takes advantage of the multipath characteristics of the channel.

In accordance with closed loop MIMO embodiments of the present invention, when spatial channels are substantially orthogonal, each spatial channel may be associated with a beamforming pattern, rather than an antenna. Signals in each spatial channel may be transmitted from the available antennas simultaneously. In other words, each antenna may transmit signals with different weights which are specific to the individual antenna. Examples of these embodiments are described in more detail below.

In some embodiments, multicarrier transmitter 100 may comprise encoder 102, which may be a forward error correcting (FEC) encoder, to apply error-correcting codes to bit stream 101 and generate encoded bit stream 103. In some embodiments, multicarrier transmitter 100 may also comprise bit demultiplexer and interleaver circuitry 104 to permute bits of encoded bit stream 103 and demultiplex the bits into a plurality of spatial/frequency channels. In some embodiments, permuted bits may be separated by bit demultiplexer of circuitry 104 into one or more spatial streams associated with each spatial channel. Each of the spatial streams may be permuted by an interleaver of circuitry 104 in accordance with an interleaving pattern. Then, bit demultiplexer of circuitry 104 may separate each of the permuted spatial streams into groups for modulation on the data subcarriers of the multicarrier communication channel. The grouping of bits may depend on the modulation levels for the subcarrier and may be provided by processing circuitry 116, although the scope of the invention is not limited in this respect.

In some embodiments, multicarrier transmitter 100 may also comprise symbol mapping circuitry 106 for each spatial stream and/or spatial channel to generate symbol-modulated subcarriers 107 from spatial channel multiplexed bit streams 105. Transmit subcarrier beamformers 108 may be associated with each subcarrier of the multicarrier communication channel and may apply quantized transmit beamforming coefficients 118 to each subcarrier signal to generate frequency-domain symbol-modulated subcarriers 109 for each transmit antenna 114.

In some embodiments, multicarrier transmitter 100 may also comprise inverse fast Fourier transform circuitry (IFFT) circuitry 110 for each transmit antenna 114 to perform an IFFT on symbol-modulated subcarriers 109 after application of quantized transmit beamforming coefficients 118 by transmit subcarrier beamformers 108 to generate time-domain samples 111 for each transmit antenna 114. In some embodiments, a cyclic extension may be added to time-domain samples 111 to help reduce the effects of intersymbol interference, although the scope of the invention is not limited in this respect.

In some embodiments, multicarrier transmitter 100 may also comprise digital to analog conversion (DAC) circuitry and radio-frequency (RF) circuitry 112 which may be associated with one of transmit antennas 114. Circuitry 112 may generate RF signals for transmission from time-domain samples 111 generated by the IFFT circuitry 10.

In some embodiments, multicarrier transmitter 100 may also comprise processing circuitry 116 to provide transmit parameters to various elements of transmitter 100. For example, processing circuitry 116 may provide interleaving parameters 120 for the interleaver of circuitry 104, subcarrier modulation levels 122 to each of symbol mapping circuitry 106, IFFT size information 124 to IFFT circuitry 110, and code type and/or coding rate information 126 to encoder 102, although the scope of the invention is not limited in this respect. In some embodiments, circuitry 116 may assign the transmit parameters based on channel feedback information 115 received from another communication station for fast link adaptation.

In some embodiments, transmit antennas 114 may be used for transmitting a plurality of spatial streams on a plurality of spatial channels over the multicarrier communication channel. In these embodiments, the number of the spatial streams and/or spatial channels may be less than or equal to the number of the transmit antennas. In some embodiments, four antennas 114 may be used to transmit up to four spatial streams over corresponding spatial channels, although the scope of the present invention is not limited in this respect.

In some embodiments, the quantized transmit beamforming coefficients for each subcarrier may represent a quantized transmit beamforming matrix ($\tilde{V}$) for each subcarrier. In some embodiments, each quantized transmit beamforming matrix ($\tilde{V}$) may be a unitary matrix having a number of rows equaling the number of the transmit antennas, and a number of columns equaling the number of the spatial streams (or spatial channels). As used herein, the use of the terms "rows" and "columns" is interchangeable.

In some embodiments, elements of each quantized transmit beamforming matrix ($\tilde{V}$) may comprise an amplitude subfield and a phase subfield with each field having predetermined numbers of bits. In some embodiments, the amplitude subfield represents the square of the amount to weight the amplitude of an associated symbol-modulated subcarrier. This is discussed more detail below with reference to FIGS. 4A and 4B. Some embodiments may use uniform quantization of the square amplitudes of the transmit beamforming coefficients. This uniform quantization may be near to optimal for a typical random Rayleigh indoor channel because the square amplitudes of the transmit beamforming coefficients have a distribution that is close to uniform.

In some embodiments, multicarrier transmitter 100 may be part of a transmitting station and may receive channel feedback information 115 comprising a quantized transmit beamforming matrix ($\tilde{V}$) for each subcarrier from a receiving station. In these embodiments, processing circuitry 116 may provide quantized transmit beamforming coefficients 118 from the quantized transmit beamforming matrix ($\tilde{V}$) to a corresponding one of transmit subcarrier beamformers 108. In these embodiments, the receiving station may measure signals received from transmitter 100 to estimate a channel transfer matrix (H) for each subcarrier of the multicarrier communication channel, and may generate the quantized beamforming matrix ($\tilde{V}$) for each subcarrier from the channel transfer matrix (H). In these embodiments, the receiving station may transmit the quantized beamforming matrix ($\tilde{V}$) for each subcarrier to the transmitting station in a response packet, although the scope of the invention is not limited in this respect. In some of these embodiments, the receiving station may measure a preamble of a packet received from the transmitting station to estimate the channel transfer matrix (H) for each subcarrier of the multicarrier communication channel. In some embodiments, the receiving station may measure a physical layer convergence protocol (PLCP) header of a packet received from the transmitting station to estimate the channel transfer matrix (H) for each subcarrier, although the scope of the invention is not limited in this respect. In some of these embodiments, the receiving station may perform a singular value decomposition (SVD) on the channel transfer matrix (H) to generate the quantized beamforming matrix ($\tilde{V}$) for each subcarrier. These embodiments are discussed in more detail below.

In some embodiments, the predetermined numbers of bits comprising the quantized beamforming matrix ($\tilde{V}$) may be lower during initial portions of a packet exchange between a transmitting station and a receiving station (i.e., during a coarse quantization mode) and may be greater during subsequent portions of the packet exchange (i.e., during a fine quantization mode). In this way, a transmitting station may quickly adjust to the channel conditions and may subsequently fine tune its transmissions as time goes on allowing for faster link adaptation.

In some embodiments, elements of the quantized beamforming matrix ($\tilde{V}$) may represent differences from previously received beamforming coefficients. In some embodiments, the quantized beamformer coefficients may be applied to groups of subcarriers. These embodiments are described in more detail below.

In some embodiments, multicarrier transmitter 100 (FIG. 1) and/or multicarrier receiver 200 (FIG. 2) may communicate over a wideband multicarrier communication channel. The wideband channel may comprise one or more multicarrier subchannels. The subchannels may be frequency-division multiplexed (i.e., separated in frequency from other subchannels) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between closely spaced subcarriers, in some embodiments, the subcarriers of a particular subchannel may have a null at substantially a center frequency of the other subcarriers of that subchannel.

In some embodiments, multicarrier transmitter 100 (FIG. 1) and/or multicarrier receiver 200 (FIG. 2) may communicate with one or more other communication stations over a multicarrier communication comprising either a standard-throughput channel or a high-throughput communication channel. In these embodiments, the standard-throughput channel may comprise one subchannel and the high-throughput channel may comprise a combination of one or more subchannels and/or one or more spatial channels associated with each subchannel. Spatial channels may be non-orthogonal channels (i.e., not separated in frequency) associated with a particular subchannel in which orthogonality may be achieved through beamforming and/or diversity.

In accordance with some embodiments, mappers 106 (FIG. 1) may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for the individual subchannel may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher data communication rates per subcarrier may also be used.

In some embodiments, the frequency spectrums for the multicarrier communication channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier transmitter 100 (FIG. 1) and/or multicarrier receiver 200 (FIG. 2) may be part of a wireless communication device. The wireless communication device may, for example, be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, the wireless communication device may transmit and/or receive RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although the wireless communication device may also be suitable to transmit and/or receive communications in accordance with other techniques including the Digital Video Broadcasting Terrestrial (DVB-T) broadcasting standard, and the High performance radio Local Area Network (HiperLAN) standard.

Antennas 114 (FIG. 1) and antennas 202 (FIG. 2) may comprise directional or omnidirectional antennas, including, for example, dipole antennas, monopole antennas, loop antennas, microstrip antennas or other type of antennas suitable for reception and/or transmission of RF signals.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Although multicarrier transmitter 100 (FIG. 1) and multicarrier receiver 200 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Figure 2:
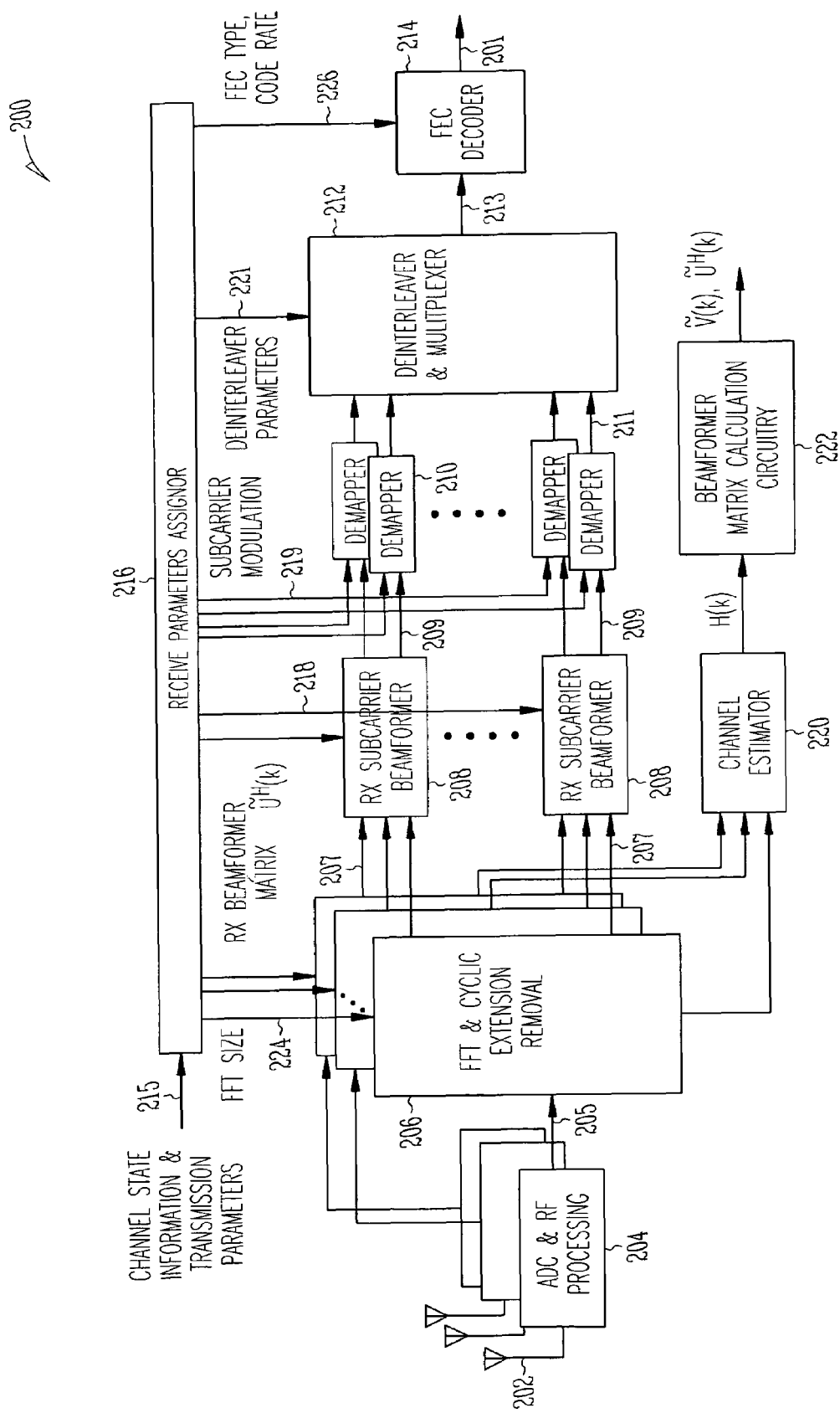
FIG. 2 is a block diagram of a multicarrier receiver in accordance with some embodiments of the present invention.

FIG. 2 is a block diagram of a multicarrier receiver in accordance with some embodiments of the present invention. Multicarrier receiver 200 may be part of a wireless communication device, and may receive multicarrier communication signals comprising a plurality of subcarriers, such as OFDM communication signals, although the scope of the invention is not limited in this respect.

In some embodiments, multicarrier receiver 200 may be part of a receiving station and may communicate over a multicarrier communication channel with a transmitting station. The transmitting station may include a multicarrier transmitter, such as multicarrier transmitter 100 (FIG. 1).

In other embodiments, multicarrier receiver 200 may be part of a multicarrier communication station that also includes a multicarrier transmitter, such as multicarrier transmitter 100. In these embodiments, the multicarrier communication station may communicate with other multicarrier communication stations as part of a network, such as a local area network, although the scope of the invention is not limited in this respect.

In accordance with some embodiments of the present invention, multicarrier receiver 200 generates a quantized transmit beamformer matrix ($\tilde{V}$) for each subcarrier for use by a transmitting station in transmitting packets to receiver 200 over the multicarrier communication channel. In these embodiments, multicarrier receiver 200 estimates a channel transfer matrix (H) for each subcarrier and generates the quantized transmit beamformer matrix ($\tilde{V}$) for each subcarrier from the channel transfer matrix (H). Multicarrier receiver 200 may also generate a receiver beamformer matrix ($\tilde{U}^H$) for each of the subcarriers to separate constellation signals from each spatial channel of signals received from the transmitting station that were transmitting using the quantized transmit beamformer matrix ($\tilde{V}$).

In some embodiments, multicarrier receiver 200 comprises a channel estimator 220 to estimate the channel transfer matrix (H) for each subcarrier, and beamformer matrix calculation circuitry 222 to generate the quantized transmit beamformer matrix ($\tilde{V}$) for each subcarrier from the associated channel transfer matrix (H).

In some embodiments, multicarrier receiver 200 comprises a plurality of receiver beamformers 208 to combine input subcarrier signals 207 in accordance with the receiver beamformer matrix ($\tilde{U}^H$) for each subcarrier to separate constellation signals from each spatial channel. As used herein, $\tilde{U}^H$ refers to a conjugate transpose of $\tilde{U}$ discussed below. Calculation circuitry 222 may calculate the receiver beamformer matrices ($\tilde{U}^H$) from the channel transfer matrix (H) and the quantized transmit beamformer matrix ($\tilde{V}$). In some embodiments, receiver beamformers 208 may combine input subcarrier signals 207 in the frequency domain based on receiver beamformer coefficients 218 of the receiver beamformer matrix ($\tilde{U}$) for an associated subcarrier. In some embodiments, input subcarrier signals 207 may be generated by performing an FFT on signals from receipt of a data packet from a transmitting station that applied the quantized transmit beamformer matrix ($\tilde{V}$) to subcarriers prior to transmission.

In some embodiments, the quantized transmit beamforming matrix ($\tilde{V}$) for each subcarrier generated by circuitry 222 comprises quantized transmit beamforming coefficients having predetermined numbers of bits indicating amounts for transmit subcarrier beamformers 108 (FIG. 1) to weight an amplitude and shift a phase of an associated subcarrier in the frequency domain.

In some embodiments, channel estimator 220 may estimate the channel transfer matrix (H) for each subcarrier of the multicarrier communication channel based on channel measurements from a preamble (e.g., a PLCP header) of a current packet sent by the transmitting station, although the scope of the invention is not limited in this respect.

In some embodiments, calculation circuitry 222 may perform, for each subcarrier, a singular value decomposition (SVD) on the channel transfer matrix (H) to generate an initial receiver beamforming matrix ($\tilde{U}^H$) and an initial (i.e., non-quantized) transmit beamforming matrix (V). In these embodiments, calculation circuitry 222 may perform a quantization on the initial transmit beamforming matrix (V) for each subcarrier to generate the quantized transmit beamforming matrix ($\tilde{V}$) for each subcarrier. The quantization may be based on predetermined numbers of bits for the amplitude and phase components and may select predetermined values for the quantized beamformer coefficients of matrix ($\tilde{V}$) based on the predetermined numbers of bits. In these embodiments, calculation circuitry 222 may generate an equivalent channel transfer matrix ($\tilde{H}$) based on an estimate of the channel transfer matrix (H) and the quantized transmit beamforming matrix ($\tilde{V}$). In these embodiments, calculation circuitry 222 may also generate the "corrected" receiver beamformer matrices ($\tilde{U}^H$) based on the equivalent channel transfer matrices ($\tilde{H}$). In these embodiments, the equivalent channel transfer matrix ($\tilde{H}$) may equal H$\tilde{V}$ (i.e., the channel transfer matrix (H) multiplied by the quantized transmit beamforming matrix ($\tilde{V}$)).

In some embodiments, the use of quantized (i.e., finite) beamforming coefficients may reduce the orthogonality between the subcarriers and/or spatial channels and may lead to crosstalk therebetween. Crosstalk may cause signal-to-interference ratio (SINR) degradation at the output of each spatial channel. The use of the "corrected" receiver beamformer matrices ($\tilde{U}^H$) may allow receipt of signals from a transmitting station using the quantized transmit beamforming matrix ($\tilde{V}$), and may help reduce the effects of the crosstalk.

In some embodiments, the channel transfer matrix (H) may be substantially equal to the initial receiver beamforming matrix (U) multiplied by a pseudo-diagonal matrix (D) multiplied by a conjugate transpose of the initial (i.e., non-quantized) transmit beamforming matrix (V). The pseudo-diagonal matrix (D) may comprise real, non-negative singular values. In some embodiments, calculation circuitry 222 may generate the corrected receiver beamformer matrices ($\tilde{U}$) based on the equivalent channel transfer matrix ($\tilde{H}$) by performing zero forcing, in accordance with the following expression:

$$\tilde{U}^H(k) = (\tilde{H}(k)^H \tilde{H}(k))^{-1} \tilde{H}(k)^H$$

In which k represents a particular subcarrier and $\tilde{U}(k)^H$ is the conjugate transpose of the corrected receiver beamformer matrix $\tilde{U}$ for subcarrier k. In general receiver subcarrier beamformers 208 apply the coefficients of a conjugate transpose of the receiver beamformer matrices ($\tilde{U}$) (i.e., $\tilde{U}^H$), to subcarrier signals 207, although the scope of the invention is not limited in this respect. In some embodiments, each one of the receiver subcarrier beamformers 208 may be associated with one subcarrier of a multicarrier communication channel.

In some embodiments, multicarrier receiver 200 may also comprise a plurality of receiver antennas 202 for receiving a plurality of spatial streams on a corresponding plurality of spatial channels over the multicarrier communication channel. In some embodiments, the number of the spatial streams may less than or equal to a number of the receiver antennas 202, although the scope of the invention is not limited in this respect.

In some embodiments, the receiver beamforming matrix ($U^H$) for each subcarrier may comprise a unitary matrix having a number of columns equaling the number of receive antennas used in receiving the spatial streams, and a number of rows equaling the number of the spatial streams (or the number of spatial channels).

In some embodiments, multicarrier receiver 200 may also comprise analog to digital conversion (ADC) and RF processing circuitry 204 to generate time-domain samples 205 from signals received from each of antennas 202. In some embodiments, multicarrier receiver 200 may also comprise FFT circuitry 206. FFT circuitry 206 may remove any cyclic extension from time-domain samples 205 and may perform an FFT on time-domain samples 205 generating frequency-domain signals 207 for each subcarrier. Receiver beamformer circuitry 208 may combine frequency-domain signals 207 for a particular subcarrier received from each antenna in accordance with coefficients 218 of a receiver beamformer matrix ($\tilde{U}^H$) for the associated subcarrier. In this way constellation symbols from each spatial channel may be separated resulting in separated symbol-modulated subcarrier signals 209.

In some embodiments, multicarrier receiver 200 may also comprise demappers 210. Demappers 210 may demap separated symbol-modulated subcarrier signals 209 to generate blocks of bits 211 from each spatial channel and for each subcarrier. In some embodiments, demappers 210 may generate the bits using log-likelihood ratios (LLRs), although the scope of the invention is not limited in this respect. In some embodiments, multicarrier receiver 200 may also comprise deinterleaver and multiplexer circuitry 212 to permute and multiplex input bits to generate encoded bit stream 213 based on deinterleaver parameters 221. In some embodiments, multicarrier receiver 200 may also comprise decoder 214 to decode encoded bit stream 213 based on code rate 226 and/or FEC type information to generate decoded bit stream 201.

Processing circuitry 216 may generate and/or assign receiver parameters for various elements of multicarrier receiver 200. For example, processing circuitry 216 may provide FFT size information 224 to FFT circuitry 206, may provide elements of receiver beamformer matrices ($\tilde{U}^H$) to receiver subcarrier beamformers 208, and may provide subcarrier modulation levels 219 to demappers 210, although the scope of the invention is not limited in this respect.

In some embodiments, the initial transmit beamforming matrices (V), which may be in the frequency domain, may be transformed to the time domain by IFFT circuitry of the receiver before quantization. The elements of this time domain transmit beamforming matrix may be represented as an array of complex numbers in a magnitude and phase format. In these embodiments, circuitry 222 may quantize the elements of the time domain transmit beamforming matrix for transmission to the transmitting station.

FIGS. 3A and 3B illustrate quantization schemes in accordance with some embodiments of the present invention. FIG. 3A illustrates quantization of a transmit beamforming matrix ($\tilde{V}$) for a subcarrier in which the predetermined number of bits of an amplitude subfield is zero bits (i.e., $n_a=0$) and the predetermined number of bits comprising a phase subfield is two bits (i.e., $n_{100}=2$). Amplitude bits are illustrated in the radial direction of the diagram and phase bits are illustrated in the circumferential direction of the diagram. In this example, the quantized transmit beamforming matrix ($\tilde{V}$) may provide up to four possible phase adjustments without any changes to the amplitude. FIG. 3B illustrates quantization of transmit beamforming matrix ($\tilde{V}$) for a subcarrier in which the predetermined number of bits of an amplitude subfield is one bit (i.e., $n_a=1$) and the predetermined number of bits comprising phase subfield is three bits (i.e., $n_{100}=3$). In this example, the quantized transmit beamforming matrix ($\tilde{V}$) may provide up to eight possible phase adjustments and two amplitude settings.

FIGS. 4A and 4B illustrate amplitude and phase subfields of quantized beamforming coefficients in accordance with some embodiments of the present invention. FIG. 4A illustrates an example in which the predetermined number of bits of amplitude subfield 402 is three bits (i.e., $n_a=3$) allowing up to eight possible amplitude settings listed in column 403. In some embodiments, one of the amplitude settings may be selected by circuitry 222 (FIG. 2) for a subfield of a quantized transmit beamformer matrix ($\tilde{V}$) for a particular subcarrier.

In some embodiments, uniform quantization of the square amplitudes of transmit beamforming coefficients are used. Some example levels of quantization are shown in column 401 of FIG. 4A. For a transmit beamforming matrix ($\tilde{V}$), subcarrier-modulated symbols may be multiplied by the square roots of quantized square amplitudes, the values of which are shown in column 403. In a response packet, the values from column 401 may be transmitted, and a look-up table at the transmitter may be used to obtain the associated beamforming coefficients for matrix $\tilde{V}$ from column 403.

FIG. 4B illustrates an example in which the predetermined number of bits of phase subfield 404 is four bits (i.e., $n_{100}=4$).) allowing up to sixteen possible phase settings listed in column 405. In some embodiments, one of the phase settings may be selected by circuitry 222 (FIG. 2) for a subfield of a quantized transmit beamformer matrix ($\tilde{V}$) for a particular subcarrier.

For example, in referring to FIGS. 4A and 4B, when a quantized transmit beamformer matrix ($\tilde{V}$) for a particular subcarrier comprises subfields 001, 0001, the associated transmit subcarrier beamformer 108 (FIG. 1) may weight (e.g., multiply) the amplitude of the associated subcarrier signal 107 (FIG. 1) by $\sqrt{0.1875}$ and may shift the phase by $-7\pi/8$.

In some embodiments, the predetermined numbers of bits comprising amplitude subfield 402 and/or phase subfield 404 may be lower during initial portions of a packet exchange between a transmitting station and a receiving station (i.e., during a coarse quantization mode). In some embodiments, the predetermined numbers of bits comprising amplitude subfield 402 and/or phase subfield 404 may be greater during subsequent portions of the packet exchange (i.e., during a fine quantization mode). In some embodiments, the receiving station may communicate the number of bits being used to the transmitting station.

In some embodiments, during the initial portions of the packet exchange, the transmitting station and the receiving station may operate in a coarse quantization mode wherein the predetermined number of bits comprising the amplitude subfield may range from zero bits to two bits, and the predetermined number of bits comprising the phase subfield may range from one-bit to three bits, although the scope of the invention is not limited in this respect. In some embodiments, during the subsequent portions the packet exchange, the transmitting station and the receiving station may operate in a fine quantization mode wherein the predetermined number of bits comprising the amplitude subfield may range from two bits to four bits and the predetermined number of bits comprising the phase subfield may range from three bits to five bits, although the scope of the invention is not limited in this respect.

Figure 5:
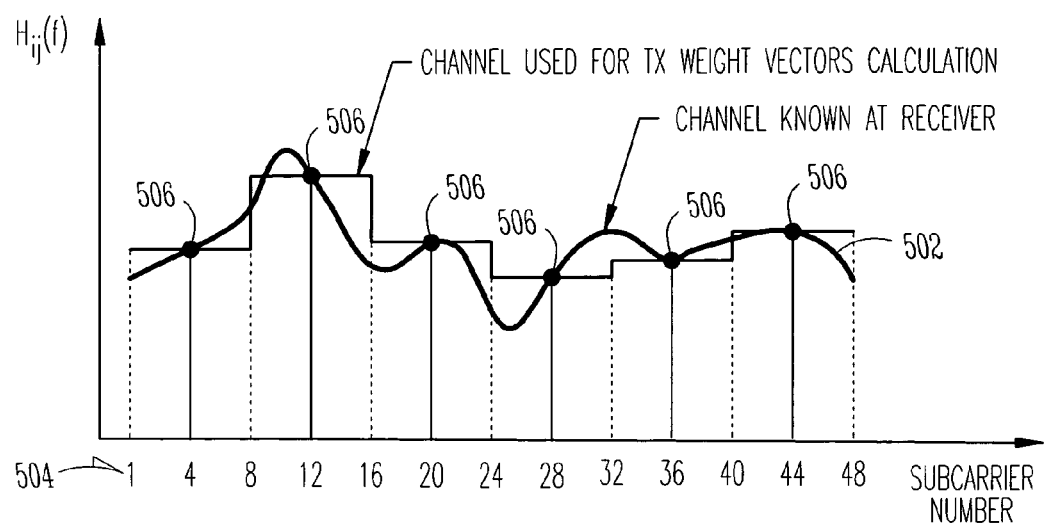
FIG. 5 illustrates channel measurements for use in generating quantized beamformer coefficients for groups of subcarriers in accordance with some embodiments of the present invention.

FIG. 5 illustrates channel measurements for use in generating quantized beamformer coefficients for groups of subcarriers in accordance with some embodiments of the present invention. In these embodiments the plurality of transmit subcarrier beamformers 108 (FIG. 1) may apply the quantized beamformer coefficients to groups of subcarriers. In some embodiments, channel response 502 may be determined by channel estimator 220 (FIG. 2) for use in generating a channel transfer matrix (H) for each subcarrier 504 of the multicarrier communication channel. Circuitry 222 (FIG. 2) may calculate a quantized transmit beamformer matrix ($\tilde{V}$) for groups of subcarriers based on the channel weight vectors 506 for the groups of subcarriers. In this way, the number of quantized transmit beamformer matrices ($\tilde{V}$) may be reduced. In FIG. 5, forty-eight subcarriers 504 are divided into six groups. Each group has eight adjacent subcarriers. In this example, one transmit beamformer matrix ($\tilde{V}$) may be provided for each group of the eight adjacent subcarriers.

Figure 6B:
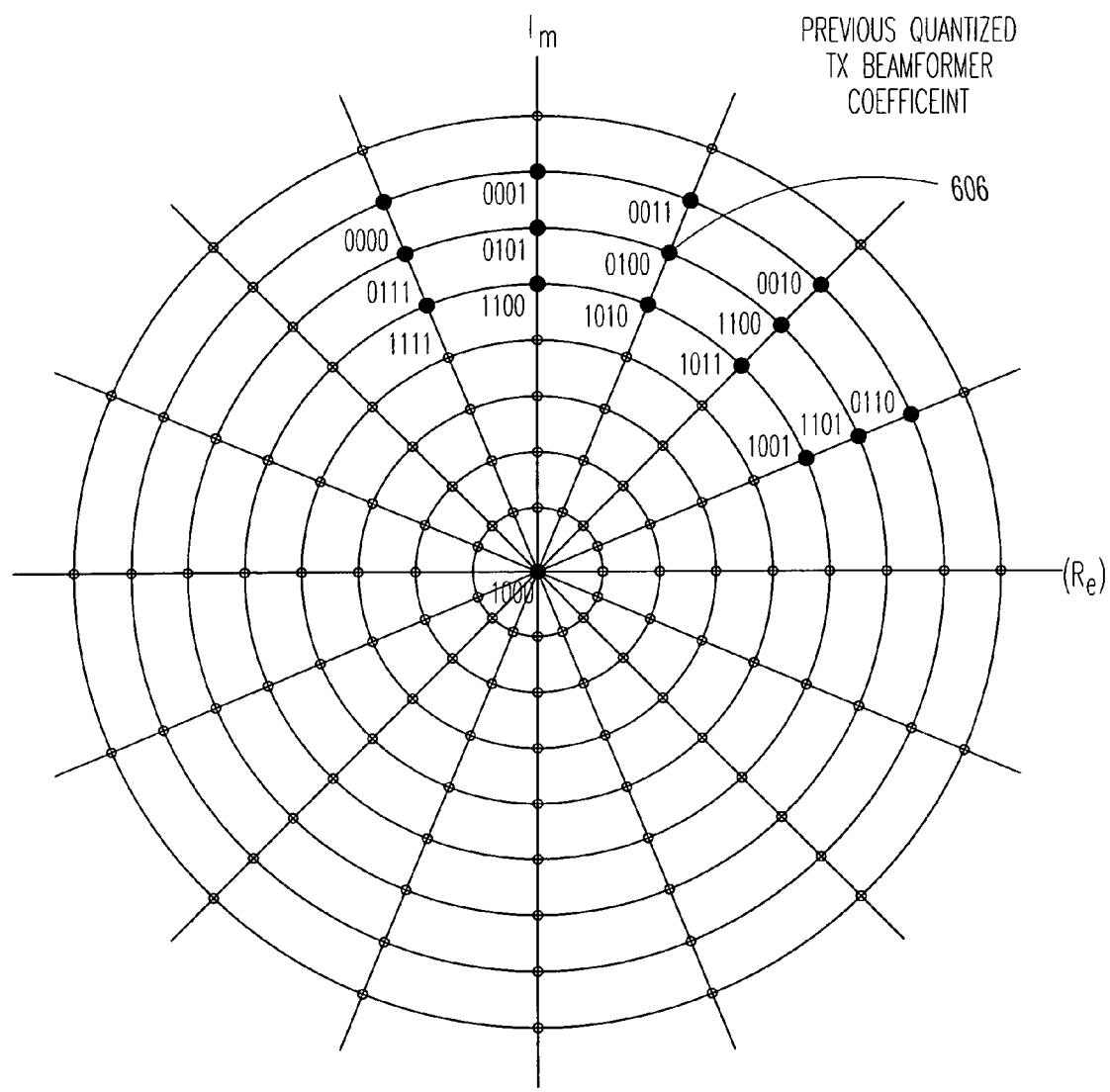

FIGS. 6A and 6B illustrate quantized transmit beamforming coefficients in accordance with some embodiments of the present invention. In these embodiments, a receiving station and a transmitting station may operate in a differential signaling mode in which the elements of a quantized beamforming matrix ($\tilde{V}$) represent differences from previously received beamforming coefficients. In these embodiments, the quantized transmit beamformer matrix ($\tilde{V}$) for a particular subcarrier of the multicarrier communication channel may comprise a predetermined number of bits which indicate an amount to adjust the amplitude and phase from a prior beamforming setting. In the example illustrated in FIG. 6A, a quantized transmit beamformer matrix ($\tilde{V}$) for a particular subcarrier may comprise four bits (shown in column 602) which may indicate to the transmitting station the action in column 604 associated with the bits. In this example, only four bits per subcarrier are used to adjust both the amplitude and phase. In some embodiments, the bits may also indicate to turn off a particular subcarrier (e.g., bits equaling 1000), although the scope of the invention is not limited in this respect.

In some embodiments, the receiving station may send an indicator to the transmitting station to indicate operations in the differential signaling mode. For example, channel feedback information 115 (FIG. 1) may comprise an indicator to indicate whether the elements of the quantized beamforming matrix ($\tilde{V}$) represent differences from the previously generated beamformer elements or represent absolute beamformer coefficients.

FIG. 6B illustrates the adjustment of quantized beamforming coefficients in the differential signaling mode. The bits associated with various point correspond to the bits of column 602 (FIG. 6A). In this illustration, the previous quantized beamforming coefficients are located at point 606. Receipt of a "0100" will result in no change to the previous quantized beamforming coefficients while receipt of other quantized beamforming coefficients may result in a change in phase and/or amplitude as illustrated.

Figure 7:
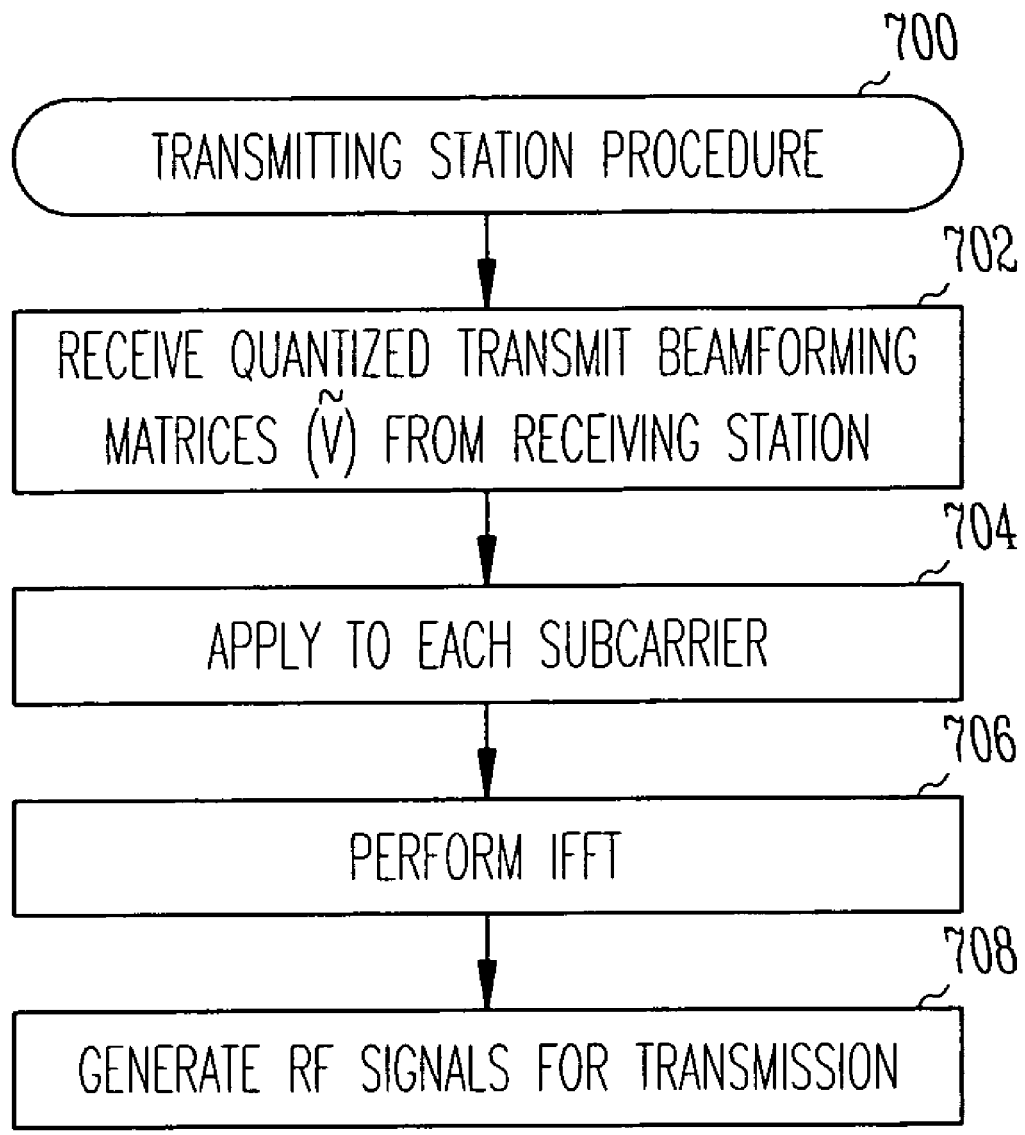
FIG. 7 is a flow chart of a multicarrier signal transmission procedure in accordance with some embodiments of the present invention.

FIG. 7 is a flow chart of a multicarrier signal transmission procedure in accordance with some embodiments of the present invention. Multicarrier signal transmission procedure 700 may be performed by a multicarrier transmitter, such as multicarrier transmitter 100 (FIG. 1), although other multicarrier transmitters may also be used to perform procedure 700.

Operation 702 comprises receiving quantized transmit beamformer matrices ($\tilde{V}$) for one or more subcarriers of a multicarrier communication channel from a receiving station. The quantized transmit beamformer matrices ($\tilde{V}$) may comprise predetermined numbers of bits for each subcarrier indicating amounts to weight an amplitude and shift a phase of an associated subcarrier.

Figure 9:
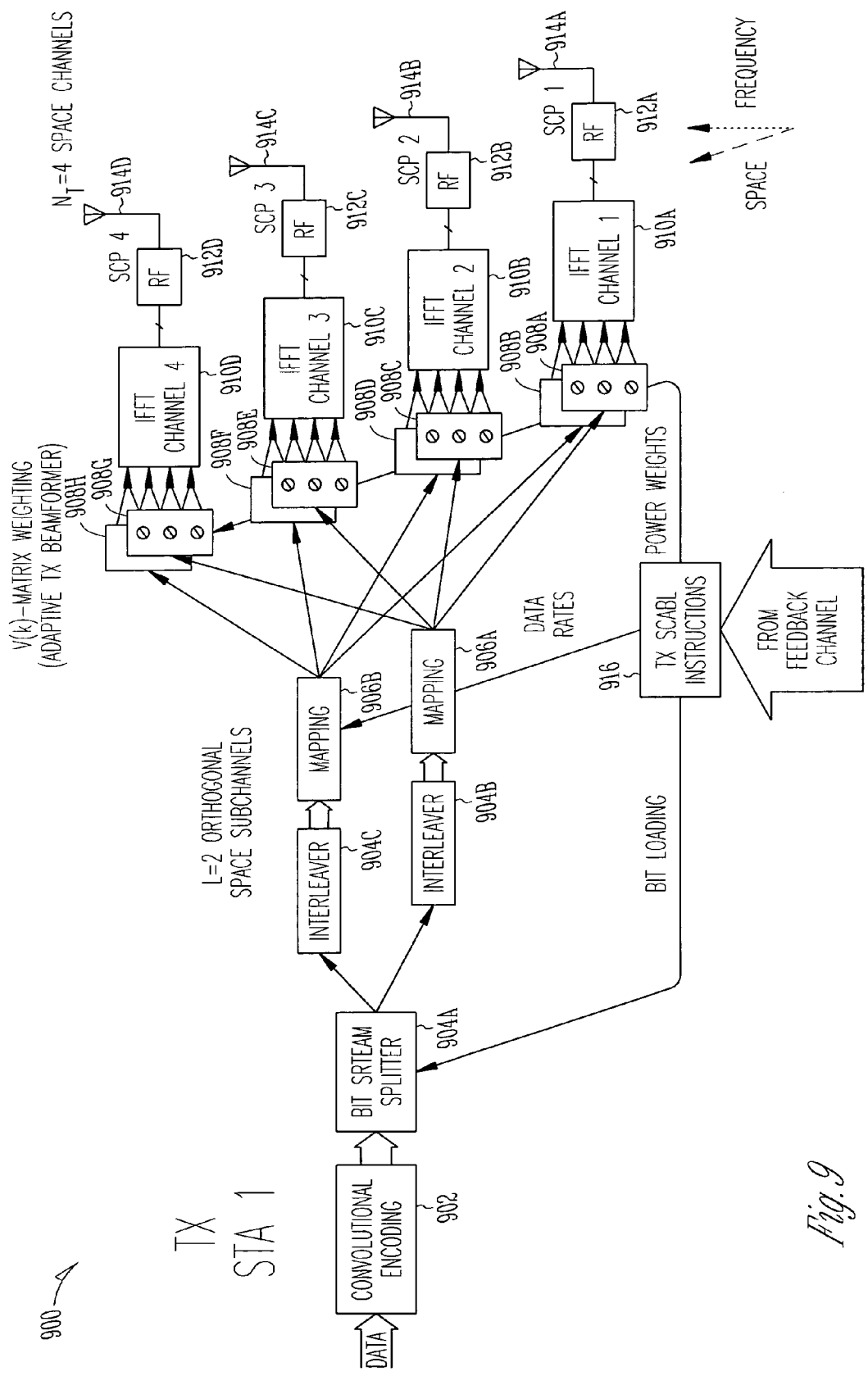
FIG. 9 is a functional diagram illustrating the operation of a 4×2 multiple-input multiple-output (MIMO) orthogonal frequency division multiplexed (OFDM) transmitter in accordance with some embodiments of the present invention.

Operation 704 comprises applying each of the quantized transmit beamformer matrices ($\tilde{V}$) to a subcarrier signal. In some embodiments, operation 704 comprises applying a quantized transmit beamformer matrix ($\tilde{V}$) to a symbol-modulated subcarrier in the frequency domain. In some embodiments, operation 704 may be performed by transmit subcarrier beamformers 108 (FIG. 1). In some embodiments, operation 704 is performed for each subcarrier and each spatial channel to form frequency-domain signals for each antenna. Examples of this operation are described in more detail below as being performed by beamformers 910 (FIG. 9) of transmitter 900 (FIG. 9).

Operation 706 comprises performing an IFFT on the subcarrier signals to generate time-domain samples for each of a plurality of transmit antennas. In some embodiments, operation 706 may be performed by IFFT circuitry 110 (FIG. 1).

Operation 708 comprises generating RF signals for transmission from the time-samples generated in operation 706. In some embodiments, operation 708 may be performed by circuitry 112 (FIG. 1). In some embodiments, RF signals may be generated for each transmit antenna.

Figure 8:
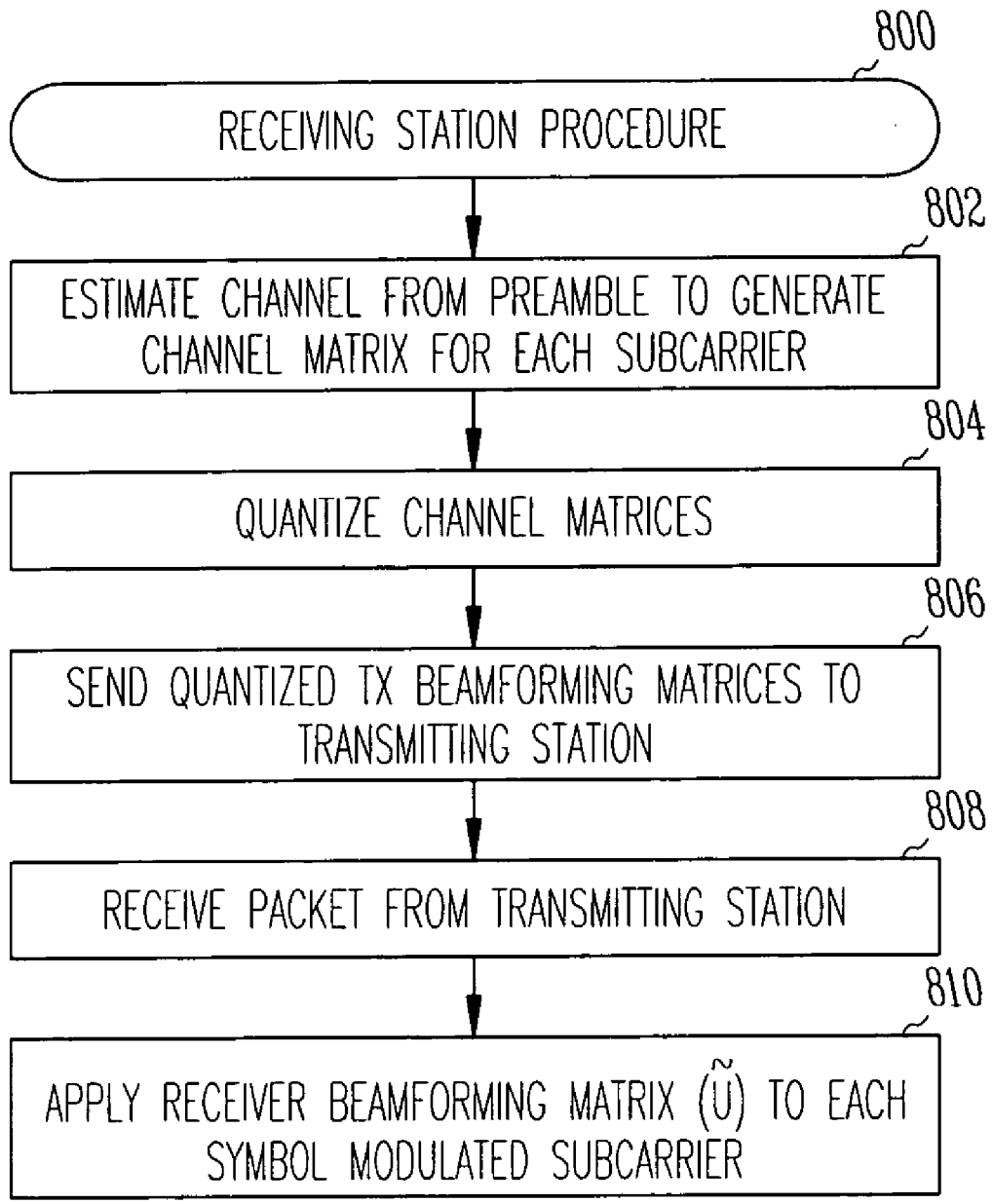
FIG. 8 is a flow chart of a multicarrier signal reception procedure in accordance with some embodiments of the present invention.

FIG. 8 is a flow chart of a multicarrier signal reception procedure in accordance with some embodiments of the present invention. Multicarrier signal reception procedure 800 may be performed by a multicarrier receiver, such as multicarrier receiver 200 (FIG. 2).

Operation 802 comprises estimating a channel transfer matrix (H) for each subcarrier of the multicarrier communication channel. In some embodiments, operation 802 may be based on a current packet or packet header received from a transmitting station. In some embodiments, operation 802 may be performed by channel estimator 220 (FIG. 2).

Operation 804 comprises generating a quantized transmit beamformer matrix ($\tilde{V}$) for each subcarrier from the channel transfer matrix (H) for an associated subcarrier. The predetermined numbers of bits of each of the quantized transmit beamformer matrices ($\tilde{V}$) may depend on the mode of operation. For example, when operating in a course quantization mode, fewer bits may be used than when operating in a fine quantization mode. Furthermore, when operating in a differential signaling mode, the quantized transmit beamformer matrix ($\tilde{V}$) may represent differences. In some embodiments, a quantized transmit beamformer matrix ($\tilde{V}$) may be generated for groups of subcarriers.

Operation 806 comprises transmitting the quantized transmit beamformer matrices ($\tilde{V}$) to a transmitting station. Operation 806 may also comprise transmitting other channel feedback information including an indication of the mode of operation.

Operation 808 comprises receiving a packet from the transmitting station. The received packet may have been transmitted using the quantized transmit beamformer matrices ($\tilde{V}$) generated by the receiving station in operation 804.

Operation 810 comprises applying receiver beamformer matrices ($\tilde{U}^H$) to the received signals. In some embodiments, operation 810 comprises combining input subcarrier signals 207 (FIG. 2) in accordance with a receiver beamformer matrix ($\tilde{U}^H$) for each subcarrier to separate constellation signals from each spatial channel. In some embodiments, the receiver beamformer matrices ($\tilde{U}$) may calculated from the channel transfer matrix (H) and the quantized transmit beamformer matrix ($\tilde{V}$) in operation 804.

In some embodiments, operation 804 comprises performing, for each subcarrier, a singular value decomposition (SVD) on the channel transfer matrix (H) to generate an initial transmit beamforming matrix (V), performing a quantization on the initial transmit beamforming matrix (V) for each subcarrier to generate the quantized transmit beamforming matrix ($\tilde{V}$) for each subcarrier. In some embodiments, operation 804 further comprises generating an equivalent channel transfer matrix ($\tilde{H}$) based on the quantized transmit beamforming matrix ($\tilde{V}$), and generating a "corrected" receiver beamformer matrices ($\tilde{U}^H$) based on the equivalent channel transfer matrix ($\tilde{H}$).

Although the individual operations of procedures 700 (FIG. 7) and 800 (FIG. 8) are illustrated and described as separate operations, one or more of the individual operations may be performed concurrently, and nothing requires that the operations be performed in the order illustrated.

Figure 10:
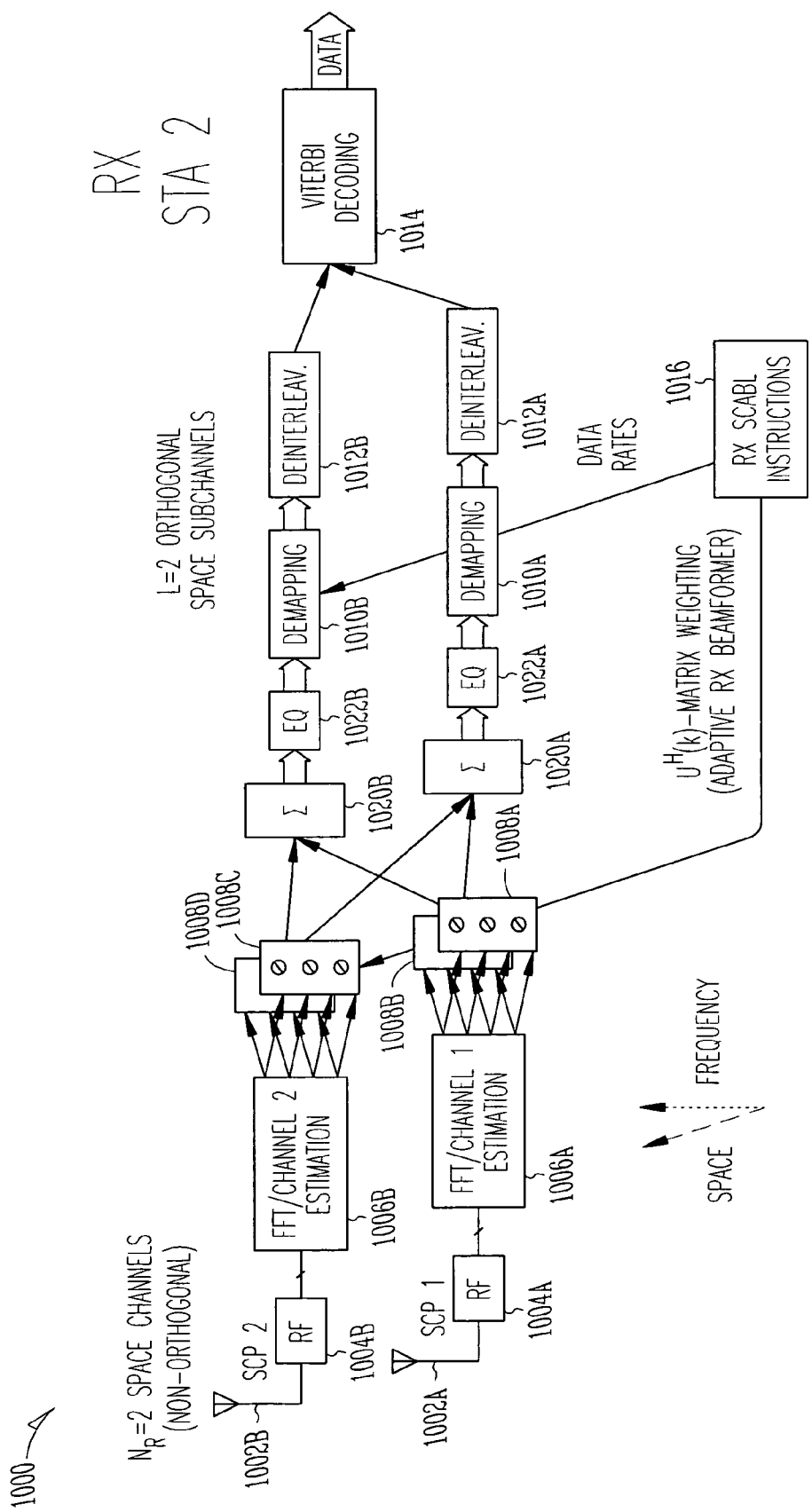
FIG. 10 is a functional diagram illustrating the operation of a multiple-input multiple-output (MIMO) orthogonal frequency division multiplexed (OFDM) receiver in accordance with some embodiments of the present invention.

FIG. 9 is a functional diagram illustrating the operation of a 4×2 multiple-input multiple-output (MIMO) orthogonal frequency division multiplexed (OFDM) transmitter in accordance with some embodiments of the present invention. FIG. 10 is a functional diagram illustrating the operation of a multiple-input multiple-output (MIMO) orthogonal frequency division multiplexed (OFDM) receiver in accordance with some embodiments of the present invention. In these example embodiments, transmitter 900 (referred to as station #1) and receiver 1000 (referred to as station #2) may comprise a 4×2 MIMO OFDM system in which transmitter 900 may transmit two data streams using four transmit antennas 914A-914D and receiver 1000 may receive the two data streams with two receive antennas 1002A and 1002B. Each of the two data streams may be transmitted over a corresponding spatial channel generated through the application of transmit beamforming matrices ($\tilde{V}$) by transmit beamformers 908A-908D.

Transmitter 900 illustrates specific embodiments of transmitter 100 (FIG. 1) in which convolutional encoder 902 corresponds to encoder 102 (FIG. 1), bit stream splitter 904A, interleaver 904B, and interleaver 904C correspond to bit demultiplexer and interleaver circuitry 104 (FIG. 1), symbol-mapping circuitry 906A and 906B correspond to symbol-mapping circuitry 106 (FIG. 1), transmit beamformers 908A-908H correspond to beamformers 108 (FIG. 1), IFFT circuitry 910A-910D correspond to IFFT circuitry 110 (FIG. 1), DAC and RF circuitries 912A-912D correspond to DAC and RF circuitries 112 (FIG. 1), transmit antennas 914A-914D correspond to transmit antennas 114, and instruction generator 916 may correspond to transmit parameter assignor 116 (FIG. 1).

In these embodiments, bit stream splitter 904A may divide an encoded bit stream received from encoder 902 into two bit streams. Each bit stream may correspond to one of the two spatial streams for transmission over a corresponding spatial channel. Interleaver 904B may perform an interleaving operation on the first bit stream and interleaver 904C may perform an interleaving operation on the second bit stream based on parameters provided by instruction generator 916. Symbol-mapping circuitry 906A may map the bits of the first bit stream to generate a first symbol stream and symbol-mapping circuitry 906B may map the bits of the second bit stream to generate a second symbol stream. Transmit beamformers 908A, 908C, 908E and 908G may each receive the first symbol stream from symbol mapping circuitry 906B. Transmit beamformers 908B, 908D, 908F and 908H may each receive the second symbol stream from symbol mapping circuitry 906C.

Transmit beamformers 908A and 908B may be associated with a first RF chain or single channel pipeline (SCP 1) that includes IFFT circuitry 910A, DAC and RF circuitry 912A, and transmit antenna 914A. Transmit beamformers 908C and 908D may be associated with a second RF chain (SCP 2) that includes IFFT circuitry 9101B, DAC and RF circuitry 912B, and transmit antenna 914B. Transmit beamformers 908E and 908F may be associated with a third RF chain (SCP 3) that includes IFFT circuitry 910C, DAC and RF circuitry 912C, and transmit antenna 914C. Transmit beamformers 908G and 908H may be associated with a fourth RF chain (SCP 4) that includes IFFT circuitry 910D, DAC and RF circuitry 912D, and transmit antenna 914D.

For the first RF chain, transmit beamformer 908A applies a quantized beamforming matrix ($\tilde{V}$) associated with each subcarrier frequency to the first symbol stream, and transmit beamformer 908B applies the quantized beamforming matrices ($\tilde{V}$) to the second symbol stream. In this example, each quantized beamforming matrix ($\tilde{V}$) may have the dimensions of the number of transmit antennas (e.g., four) by the number of spatial channels (e.g., two). IFFT circuitry 910A receives the weighted signals (e.g., frequency domain signals for each subcarrier) from both transmit beamformer 908A and transmit beamformer 908B, and performs an IFFT to generate time domain samples for DAC and RF circuitry 912A. Accordingly, antenna 914A transmits a signal having components from each of the two spatial data streams. The same operations are performed for the other three RF chains allowing the four antennas to generate two spatial channels for the communication of the two spatial streams.

In these 4×2 MIMO embodiments, up to two spatial data streams may be transmitted using four transmit antennas, although the scope of the invention is not limited in this respect. Although FIG. 9 is described as using four transmit antennas 914 to transmit two spatial streams, this is not a requirement; as little as two transmit antennas may be used.

Referring to FIG. 10, receiver 1000 illustrates specific embodiments of receiver 200 (FIG. 2) in which receive antennas 1002A and 1002B correspond to receive antennas 202 (FIG. 2), RF processing circuitry 1004A and 1004B correspond to ADC and RF processing circuitries 204 (FIG. 2), FFT circuitry 1006A and 1006B correspond to FFT circuitry 206 (FIG. 2) and channel estimator 220 (FIG. 2), receive beamformers 1008A through 1008D correspond to receive beamformers 208 (FIG. 2), demappers 1010A and 1010B correspond to demappers 210 (FIG. 2), and deinterleavers 1012A and 1012B correspond to circuitry 212 (FIG. 2). For simplicity, the block diagram illustrating receiver 200 (FIG. 2) does not illustrate elements corresponding to channel equalizers 1022A and 1022B and combiners 1020A and 1020B.

At receiver 1000, at least two receive antennas 1002A and 1002B may be used together to receive the two spatial streams transmitted by transmitter 900. Receive antennas 1002A and 1002B each receive multicarrier signals having components transmitted by each of transmit antennas 914A though 914D. Receiver 1000 comprises a first RF chain comprising receive antenna 1002A, RF circuitry 1004A, FFT circuitry 1006A and receive beamformers 1008A and 1008B. Receiver 1000 also comprises a second RF chain comprising receive antenna 1002B, RF circuitry 1004B, FFT circuitry 1006B and receive beamformers 1008D and 1008D. Symbol combiner 1020A, equalizer 1022A, demapper 1010A and deinterleaver 1012A may be associated with the first spatial channel or first spatial data stream, while symbol combiner 1020B, equalizer 1022B, demapper 1010B and deinterleaver 1012B may be associated with the spatial channel or first spatial data stream.

In the case of the first RF chain, FFT circuitry 1006A generates frequency domain symbol modulated subcarriers for each subcarrier which are provided to receive beamformers 1008A and 1008B which apply a receive beamformer matrix ($\tilde{U}^H$) to symbols from each subcarrier. Receive beamformer 1008A generates symbols associated with the first spatial channel and receive beamformer 1008B generates symbols associated with the second spatial channel. Similar operations are performed for the second RF chain.

Symbol combiner 1020A combines symbols of the first spatial channel received from receive beamformer 1008A with symbols of the first spatial channel received from receive beamformer 1008C. Symbol combiner 1020B combines symbols of the second spatial channel received from receive beamformer 1008B with symbols of the second spatial channel received from receive beamformer 1008D. The combined symbols of the first spatial channel are equalized by equalizer 1022A, demapped by demapper 1010A and deinterleaved by deinterleaver 1012A. The combined symbols of the second spatial channel are equalized by equalizer 1022B, demapped by demapper 1010B and deinterleaved by deinterleaver 1012B. Decoder 1014 may decode bits of both spatial channels/spatial streams.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, processing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A multicarrier transmitter comprising:
   transmit subcarrier beamformers to apply quantized transmit beamforming coefficients to a plurality of symbol-modulated subcarriers in a signal path before an inverse Fourier transform (IFFT) is performed on the symbol-modulated subcarriers,
   wherein the quantized transmit beamforming coefficients comprise predetermined numbers of bits for the subcarriers indicating amounts to weight an amplitude and shift a phase of an associated one or more subcarriers, and
   wherein the predetermined numbers of bits are lower during initial portions of a packet exchange between the multicarrier transmitter and a receiving station and are greater during subsequent portions of the packet exchange.

2. The transmitter of claim 1 wherein the quantized transmit beamforming coefficients applied during the subsequent portions of the packet exchange represent differences from previously applied quantized transmit beamforming coefficients.

3. A multicarrier transmitter comprising:
   transmit subcarrier beamformers to apply quantized transmit beamforming coefficients to a plurality of symbol-modulated subcarriers in a signal path before an inverse Fourier transform (IFFT) is performed on the symbol-modulated subcarriers,
   wherein the quantized transmit beamforming coefficients comprise predetermined numbers of bits for the subcarriers indicating amounts to weight an amplitude and shift a phase of an associated one or more subcarriers,
   wherein each one of the transmit subcarrier beamformers is associated with one subcarrier of a multicarrier communication channel,
   wherein the transmitter further comprises a plurality of transmit antennas for transmitting a plurality of spatial streams on a corresponding plurality of spatial channels over a multicarrier communication channel,
   wherein a number of the spatial streams is less than or equal to a number of the transmit antennas, and
   wherein the quantized transmit beamforming coefficients for each subcarrier correspond to a quantized transmit beamforming matrix ($\tilde{V}$) for each subcarrier, the matrix being a unitary matrix having a number of rows equaling the number of the transmit antennas, and a number of columns equaling the number of the spatial streams, wherein elements of the quantized transmit beamforming matrix ($\tilde{V}$)comprise an amplitude subfield and a phase subfield, each subfield having a predetermined number of bits.

4. The transmitter of claim 3 wherein the predetermined numbers of bits comprising the amplitude subfield and the phase subfield is lower during initial portions of a packet exchange between the transmitting station and a receiving station and is greater during subsequent portions of the packet exchange.

5. The transmitter of claim 4 wherein during the initial portions of the packet exchange, the transmitting station and the receiving station operate in a coarse quantization mode wherein the predetermined number of bits comprising the amplitude subfield ranges from zero bits to two bits and the predetermined number of bits comprising phase subfield ranges from one-bit to three bits, and wherein during the subsequent portions the packet exchange, the transmitting station and the receiving station operate in a fine quantization mode wherein the predetermined number of bits comprises the amplitude subfield ranges from two bits to four bits and the predetermined number of bits comprising phase subfield ranges from three bits to five bits.

6. The transmitter of claim 3 wherein elements of the quantized beamforming matrix ($\tilde{V}$)represent differences from previously received beamforming coefficients, and wherein the channel feedback information comprises an indicator to indicate whether the elements of the quantized beamforming matrices (V) represent a difference from the previously generated elements or represent absolute beamformer coefficients.

7. A multicarrier transmitter comprising:

transmit subcarrier beamformers to apply quantized transmit beamforming coefficients to a plurality of symbol-modulated subcarriers in a signal path before an inverse Fourier transform (IFFT) is performed on the symbol-modulated subcarriers, wherein the quantized transmit beamforming coefficients comprise predetermined numbers of bits for the subcarriers indicating amounts to weight an amplitude and shift a phase of an associated one or more subcarriers, wherein each one of the transmit subcarrier beamformers is associated with one subcarrier of a multicarrier communication channel, wherein the transmitter is part of a transmitting station and receives channel feedback information comprising a quantized transmit beamforming matrix ($\tilde{V}$) for each subcarrier from a receiving station, and wherein the receiving station measures signals received from the transmitting station to estimate a channel transfer matrix (H) for each subcarrier of the multicarrier communication channel, and generates the quantized beamforming matrix ($\tilde{V}$) for each subcarrier for transmission to the transmitting station in a response packet.

8. The transmitter of claim 7 wherein the receiving station measures a preamble of a packet received from the transmitting station to estimate the channel transfer matrix (H) for each subcarrier of the multicarrier communication channel.

9. The transmitter of claim 7 wherein the receiving station performs a singular value decomposition (SVD) on the channel transfer matrix (H) to generate the quantized beamforming matrix ($\tilde{V}$) for each subcarrier.

10. A multicarrier transmitter comprising:

transmit subcarrier beamformers to apply quantized transmit beamforming coefficients to a plurality of symbol-modulated subcarriers in a signal path before an inverse Fourier transform (IFFT) is performed on the symbol-modulated subcarriers, wherein the quantized transmit beamforming coefficients comprise predetermined numbers of bits for the subcarriers indicating amounts to weight an amplitude and shift a phase of an associated one or more subcarriers, wherein the transmitter further comprises:

processing circuitry to provide the quantized beamforming coefficients from a quantized beamforming matrix ($\tilde{V}$) received from a receiving station as part of channel feed back information;

symbol mapping circuitry to generate the symbol-modulated subcarriers from spatial channel multiplexed bit streams for the transmit subcarrier beamformers; and inverse fast Fourier transform circuitry (IFFT) circuitry for each transmit antenna to perform a FFT on the symbol-modulated subcarriers after application of the quantized transmit beamforming coefficients by the transmit subcarrier beamformers.

11. A multicarrier transmitter comprising:

transmit subcarrier beamformers to apply quantized transmit beamforming coefficients to a plurality of symbol-modulated subcarriers in a signal path before an inverse Fourier transform (IFFT) is performed on the symbol-modulated subcarriers, wherein the quantized transmit beamforming coefficients comprise predetermined numbers of bits for the subcarriers indicating amounts to weight an amplitude and shift a phase of an associated one or more subcarriers, wherein the transmitter is part of a first communication station and wherein the quantized transmit beamforming coefficients are used for transmitting a data packet to a second communication station, wherein the second communication station comprises a channel estimator to estimate a channel transfer matrix (H) for each subcarrier from a current packet sent by the first communication station and beamformer matrix calculation circuitry to generate the quantized transmit beamformer matrices ($\tilde{V}$) for use by the first communication station.

12. The transmitter of claim 11 wherein the plurality of transmit subcarrier beamformers apply the quantized beamformer coefficients to groups of subcarriers.

13. The transmitter of claim 11 wherein the second communication station combines input subcarrier signals generated from receipt of the data packet in accordance with a receiver beamformer matrix ($\tilde{U}^H$) for each subcarrier to separate constellation signals from each spatial channel, wherein the beamformer matrix calculation circuitry calculates the receiver beamformer matrices ($\tilde{U}^H$) from the channel transfer matrix (H) and the quantized transmit beamformer matrix ($\tilde{V}$).

14. A multicarrier transmitter comprising:

transmit subcarrier beamformers to apply quantized transmit beamforming coefficients to a plurality of symbol-modulated subcarriers in a signal path before an inverse Fourier transform (IFFT) is performed on the symbol-modulated subcarriers, wherein the quantized transmit beamforming coefficients comprise predetermined numbers of bits for the subcarriers indicating amounts to weight an amplitude and shift a phase of an associated one or more subcarriers, wherein the transmitter is part of a multicarrier communication station which further comprises a multicarrier receiver, the multicarrier receiver comprising:

a channel estimator to estimate a channel transfer matrix (H) for each subcarrier from a current packet sent by another multicarrier communication station;

beamformer matrix calculation circuitry to generate quantized transmit beamformer matrix ($\tilde{V}$) for each subcarrier for use by the other communication station; and a plurality of receiver beamformers to combine in the frequency domain, subcarrier signals generated from receipt of a data packet from the other communication station in accordance with a receiver beamformer matrix ($\tilde{U}^H$) for each subcarrier to separate constellation signals from each spatial channel, wherein beamformer matrix calculation circuitry further calculates the receiver beamformer matrices ($\tilde{U}^H$) from the channel transfer matrix (H) and the quantized transmit beamformer matrix ($\tilde{V}$).

15. A multicarrier receiver comprising:

a channel estimator to estimate a channel transfer matrix (H) for one or more subcarriers of a multicarrier communication channel;

beamformer matrix calculation circuitry to generate a quantized transmit beamformer matrix ($\tilde{V}$) for each of the subcarriers from an associated one of the channel transfer matrices (H); and a plurality of receiver beamformers to combine input subcarrier signals in accordance with a receiver beamformer matrix ($\tilde{U}^H$) for each subcarrier to separate constellation signals from each spatial channel, wherein the calculation circuitry calculates the receiver beamformer matrices ($\tilde{U}^H$) from the channel transfer matrix (H) and the quantized transmit beamformer matrix ($\tilde{V}$) for an associated one of the subcarriers.

16. The receiver of claim 15 wherein the quantized transmit beamforming matrix ($\tilde{V}$) for each subcarrier comprises quantized transmit beamforming coefficients having predetermined numbers of bits indicating amounts for transmit subcarrier beamformers to weight an amplitude and shift a phase of an associated subcarrier, wherein the channel estimator estimates the channel transfer matrix (H) for each subcarrier of the multicarrier communication channel based on channel measurements from a preamble of a current packet.

17. The receiver of claim 15 wherein the calculation circuitry performs, for each subcarrier, a singular value decomposition (SVD) on the channel transfer matrix (H) to generate an initial transmit beamforming matrix (V), wherein the calculation circuitry performs a quantization on the initial transmit beamforming matrix (V) for each subcarrier to generate the quantized transmit beamforming matrix ($\tilde{V}$) for each subcarrier, and wherein the calculation circuitry generates an equivalent channel transfer matrix ($\tilde{H}$) based on the quantized transmit beamforming matrix ($\tilde{V}$) and wherein the calculation circuitry generates receiver beamformer matrices ($\tilde{U}^H$) based on the equivalent channel transfer matrix ($\tilde{H}$) for an associated subcarrier.

18. The receiver of claim 15 wherein each one of the receiver subcarrier beamformers is associated with one subcarrier of the multicarrier communication channel.

19. The receiver of claim 18 further comprising a plurality of receiver antennas for receiving a plurality of spatial streams on a corresponding plurality of spatial channels over a multicarrier communication channel, wherein a number of the spatial streams is less than or equal to a number of the receiver antennas, and wherein the receiver beamforming matrix ($\tilde{U}^H$) for each subcarrier comprises a unitary matrix having a number of columns equaling the number of receive antennas used in receiving the spatial streams, and a number of rows equaling the number of the spatial streams, wherein elements of the quantized transmit beamforming matrix ($\tilde{V}$) comprise an amplitude subfield and a phase subfield, each subfield having a predetermined numbers of bits.

20. The receiver of claim 19 wherein the predetermined numbers of bits comprising the amplitude subfield and the phase subfield is lower during initial portions of a packet exchange between a transmitting station and a receiving station and is greater during subsequent portions of the packet exchange.

21. The receiver of claim 20 wherein during the initial portions of the packet exchange, the transmitting station and the receiving station operate in a coarse quantization mode wherein the predetermined number of bits comprising the amplitude subfield ranges from zero bits to two bits and the predetermined number of bits comprising phasesubfield ranges from one-bit to three bits, and wherein during the subsequent portions the packet exchange, the transmitting station and the receiving station operate in a fine quantization mode wherein the predetermined number of bits comprises the amplitude subfield ranges from two bits to four bits and the predetermined number of bits comprising phase subfield ranges from three bits to five bits.

22. The receiver of claim 19 wherein elements of the quantized transmit beamforming matrix ($\tilde{V}$)represent differences from previously generated beamforming coefficients, and wherein the receiver sends channel feedback information to a transmitting station comprising an indicator to indicate whether the elements of the quantized transmit beamforming matrix ($\tilde{V}$) represent a difference from the previously generated elements or represent absolute beamformer coefficients.

23. The receiver of claim 15 wherein the plurality of receiver subcarrier beamformers apply coefficients from the receiver beamformer matrix ($\tilde{U}^H$) to groups of adjacent subcarriers.

24. A method for communicating signals over a multicarrier communication channel comprising:

applying quantized transmit beamforming coefficients to a plurality of symbol-modulated subcarriers; and performing an inverse fast Fourier transform to the symbol-modulated subcarriers after applying the quantized transmit beamforming coefficients, wherein the quantized transmit beamforming coefficients comprise predetermined numbers of bits for each subcarrier of a multicarrier communication channel indicating amounts to weight an amplitude and shift a phase of an associated subcarrier, and wherein the method further comprises receiving a quantized transmit beamformer matrix ($\tilde{V}$) for each subcarrier from a receiving station, wherein the receiving station measures signals received from a transmitting station to estimate a channel transfer matrix (H) for each subcarrier and generates the quantized beamforming matrix ($\tilde{V}$) for each subcarrier for transmission to the transmitting station, wherein the receiving station performs a singular value decomposition (SVD) on the channel transfer matrix (H) to generate the quantized beamforming matrix ($\tilde{V}$) for each subcarrier.

25. The method of claim 24 wherein the predetermined numbers of bits comprising the quantized transmit beamforming matrices is lower during initial portions of a packet exchange between the transmitting station and the receiving station and is greater during subsequent portions of the packet exchange.

26. A method for communicating multicarrier communication signals over a multicarrier communication channel comprising:
estimating a channel transfer matrix (H) for each subcarrier of the multicarrier communication channel;
generating a quantized transmit beamformer matrix ($\tilde{V}$) for each subcarrier from an associated one of the channel transfer matrices (H); and
combining input subcarrier signals in accordance with a receiver beamformer matrix ($\tilde{U}^H$) for each subcarrier to separate constellation signals from each spatial channel,
wherein the receiver beamformer matrix ($\tilde{U}^H$) for a subcarrier is calculated from the channel transfer matrix (H) and the quantized transmit beamformer matrix ($\tilde{V}$) for the associated subcarrier, and
wherein the input subcarrier signals were transmitted a transmitting station using the quantized transmit beamformer matrix ($\tilde{V}$).

27. The method of claim 26 further comprising:
performing, for each subcarrier, a singular value decomposition (SVD) on the channel transfer matrix (H) to generate an initial transmit beamforming matrix (V),
performing a quantization on the initial transmit beamforming matrix (V) for each subcarrier to generate the quantized transmit beamforming matrix ($\tilde{V}$) for each subcarrier.

28. The method of claim 27 further comprising:
generating an equivalent channel transfer matrix ($\tilde{H}$) based on the quantized transmit beamforming matrix ($\tilde{V}$); and
generating corrected receiver beamformer matrices ($\tilde{U}^H$) based on the equivalent channel transfer matrix ($\tilde{H}$).

29. A system comprising:
one or more substantially omnidirectional antennas to receive signals through a multicarrier communication channel;
a channel estimator to estimate a channel transfer matrix (H) for one or more subcarriers of the multicarrier communication channel;
beamformer matrix calculation circuitry to generate a quantized transmit beamformer matrix ($\tilde{V}$) for each of the subcarriers from an associated one of the channel transfer matrices (H); and
a plurality of receiver beamformers to combine input subcarrier signals in accordance with a receiver beamformer matrix ($\tilde{U}^H$) for each subcarrier to separate constellation signals from each spatial channel,
wherein the calculation circuitry calculates the receiver beamformer matrices ($\tilde{U}^H$) from the channel transfer matrix (H) and the quantized transmit beamformer matrix ($\tilde{V}$) for an associated one of the subcarriers.

30. The system of claim 29 wherein the quantized transmit beamforming matrix ($\tilde{V}$) for each subcarrier comprises quantized transmit beamforming coefficients having predetermined numbers of bits indicating amounts for transmit subcarrier beamformers to weight an amplitude and shift a phase of an associated subcarrier,
wherein the channel estimator estimates the channel transfer matrix (H) for each subcarrier of the multicarrier communication channel based on channel measurements from a preamble of a current packet.

31. The system of claim 30 wherein the calculation circuitry performs, for each subcarrier, a singular value decomposition (SVD) on the channel transfer matrix (H) to generate an initial transmit beamforming matrix (V),
wherein the calculation circuitry performs a quantization on the initial transmit beamforming matrix (V) for each subcarrier to generate the quantized transmit beamforming matrix ($\tilde{V}$) for each subcarrier, and
wherein the calculation circuitry generates an equivalent channel transfer matrix ($\tilde{H}$) based on the quantized transmit beamforming matrix ($\tilde{V}$) and
wherein the calculation circuitry generates receiver beamformer matrices ($\tilde{U}^H$) based on the equivalent channel transfer matrix ($\tilde{H}$) for an associated subcarrier.

32. A machine-readable storage medium that stores instructions, which when executed by one or more processors, cause the processors to perform operations comprising:
estimating a channel transfer matrix (H) for each subcarrier of a multicarrier communication channel;
generating a quantized transmit beamformer matrix ($\tilde{V}$) for each subcarrier from an associated one of the channel transfer matrices (H); and
combining input subcarrier signals in accordance with a receiver beamformer matrix ($\tilde{U}^H$) for each subcarrier to separate constellation signals from each spatial channel,
wherein the receiver beamformer matrix ($\tilde{U}^H$) for a subcarrier is calculated from the channel transfer matrix (H) and the quantized transmit beamformer matrix ($\tilde{V}$) for the associated subcarrier, and
wherein the input subcarrier signals were transmitted a transmitting station using the quantized transmit beamformer matrix ($\tilde{V}$).

33. The machine-readable storage medium of claim 32 wherein the instructions, when further executed by one or more of the processors cause the processors to perform operations further comprising:
performing, for each subcarrier, a singular value decomposition (SVD) on the channel transfer matrix (H) to generate an initial transmit beamforming matrix (V),
performing a quantization on the initial transmit beamforming matrix (V) for each subcarrier to generate the quantized transmit beamforming matrix ($\tilde{V}$) for each subcarrier.

34. The machine-readable storage medium of claim 33 wherein the instructions, when further executed by one or more of the processors cause the processors to perform operations further comprising:
generating an equivalent channel transfer matrix ($\tilde{H}$) based on the quantized transmit beamforming matrix ($\tilde{V}$); and
generating corrected receiver beamformer matrices ($\tilde{U}^H$) based on the equivalent channel transfer matrix ($\tilde{H}$).

* * * * *

UNITED STATES PATENT AND TRADEMARK OFFICE
CERTIFICATE OF CORRECTION

PATENT NO. : 7,570,696 B2 Page 1 of 1
APPLICATION NO. : 10/877943
DATED : August 4, 2009
INVENTOR(S) : Maltsev et al.

It is certified that error appears in the above-identified patent and that said Letters Patent is hereby corrected as shown below:

On the Title page, in Item (56), under "Other Publications", in column 2, line 2, delete "P802.1" and insert -- P802.11 --, therefor.

In column 17, line 2, in Claim 3, delete "($\tilde{V}$)comprise" and insert -- ($\tilde{V}$) comprise --, therefor.

In column 17, line 26, in Claim 6, delete "($\tilde{V}$)represent" and insert -- ($\tilde{V}$) represent --, therefor.

In column 20, line 21, in Claim 21, delete "phasesubfield" and insert -- phase subfield --, therefor.

In column 20, line 32, in Claim 22, delete "($\tilde{V}$)represent" and insert -- ($\tilde{V}$) represent --, therefor.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,570,696 B2 Page 1 of 1
APPLICATION NO. : 10/877943
DATED : August 4, 2009
INVENTOR(S) : Maltsev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Seventh Day of September, 2010

David J. Kappos
*Director of the United States Patent and Trademark Office*